United States Patent [19]

Hanazono et al.

[11] 3,781,476

[45] Dec. 25, 1973

[54] MAGNETIC HEAD HAVING A COMBINATION CORE FORMED FROM A PRETREATED MAGNETIC LAYER

[75] Inventors: Masanobu Hanazono; Osamu Asai, both of Hitachi, Japan

[73] Assignee: Hitachi, Ltd., Tokyo, Japan

[22] Filed: Dec. 27, 1971

[21] Appl. No.: 212,383

[30] Foreign Application Priority Data

Dec. 25, 1970 Japan .............................. 45/117606

[52] U.S. Cl. .......................................... 179/100.2 C

[51] Int. Cl. .............................................. G11b 5/16

[58] Field of Search ............................ 179/100.2 C; 340/174.1 F; 346/74 MC

[56] References Cited

UNITED STATES PATENTS

| | | | |
|---|---|---|---|
| 3,344,237 | 9/1967 | Gregg | 179/100.2 C |
| 3,639,699 | 2/1972 | Tiemann | 179/100.2 C |
| 2,694,754 | 11/1954 | Connell | 179/100.2 C |
| 3,145,452 | 8/1964 | Camras | 179/100.2 C |
| 3,619,514 | 11/1971 | Barcaro | 179/100.2 C |

*Primary Examiner*—Vincent P. Canney
*Assistant Examiner*—Robert S. Tupper
*Attorney*—Craig, Antonelli & Hill

[57] ABSTRACT

A magnetic head for use in a magnetic disc of a computer, a magnetic drum or a video tape recorder manufactured through by a thin film technique. A first portion of the magnetic core thereof is a pretreated rolled permalloy which reduces the magnetic reluctance of the core to almost one-half of that of the conventional cores. This first portion taken with a second portion form a somewhat U-shaped core. Between the open ends is disposed a conductive layer surrounded by one or more dielectric layers. A supporting insulating layer may be provided over the second portion of the core.

12 Claims, 15 Drawing Figures

PATENTED DEC 25 1973 3,781,476

MAGNETIC HEAD HAVING A COMBINATION CORE FORMED FROM A PRETREATED MAGNETIC LAYER

BACKGROUND OF THE INVENTION

The present invention relates to a magnetic head for use in a magnetic disc of a computer, a magnetic drum and video tape recorder which is produced through a thin film technique.

The size of the magnetic head is substantially reduced through the application of thin film techniques. As a result, information stored in a predetermined area of a recording medium in the form of magnetic signals, in other words, recording density, is greatly increased. The magnetic core portion of the magnetic head has been conventionally formed through plating or deposition processes. Generally a magnetic core formed through plating or deposition had poor magnetic properties, thereby reducing magnetic efficiency or head efficiency for recording and reproducing magnetic signals. Further, since magnetic properties vary depending upon the plating or deposition conditions, mass production of magnetic heads through thin film techniques was extremely difficult. Also, the film-like magnetic core was apt to come off from the base material because of distortions remaining therein.

SUMMARY OF THE INVENTION

An object of the present invention is to provide a magnetic head with substantially reduced size which improves the performance thereof.

Another object of the present invention is to provide a magnetic head having an improved magnetic efficiency or a head efficiency.

Still another object of the present invention is to provide a magnetic head having high reliability.

A further object of the present invention is to provide a method for manufacturing a magnetic head to which thin film techniques are applied.

Finally, an object of the present invention is to provide a method for manufacturing a magnetic head which is suitable for mass production.

The magnetic head of the present invention is produced by the method of the thin film technique. A pretreated sheet or foil of magnetic material, preferably a rolled permalloy or ferrite piece, which has a high magnetic permeability, is used as a first or base magnetic portion of the magnetic core member of the magnetic head. The other components of the magnetic head such as a first dielectric layer, a conductive layer, a second dielectric layer, a second magnetic portion of the magnetic core member, one end of which is connected to the first magnetic portion of the magnetic core member and the other end of which constitutes a magnetic gap together with the first portion of the magnetic core member, and a supporting layer of an insulating material are formed successively on the first portion of the magnetic core member through the application of the thin film technique.

BRIEF DESCRIPTION OF THE DRAWING

These and other objects, features and advantages of the invention will become more apparent from the following detailed description and the attendant drawings wherein.

DESCRIPTION OF THE PREFERRED EMBODIMENTS

Figure 1:
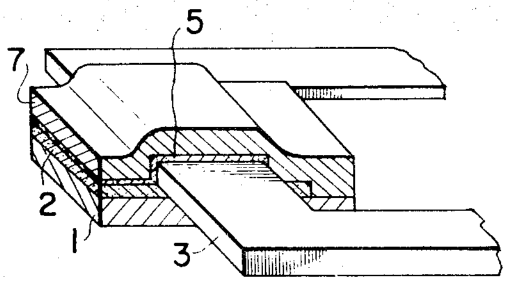
FIG. 1 is a perspective view of a magnetic head in accordance with the present invention, wherein the outer supporting insulator has been eliminated for convenience of explanation.

In FIG. 1, a first magnetic layer 1, which serves as a base element and constitutes a first portion of the magnetic core member, is cut out from a pretreated sheet or foil-like magnetic material. The magnetic material is selected from the group of permalloy, alloys of Ni—Fe—Mo, alloys of Ni—Co, alloys of Fe—Ni—Co—Al, Copper, alloys of Fe—Cu—Ni, alloys of Fe—Cu—Ni—Co, alloys of Fe—Co, and alloys of Mn—Bi. When the mechanical strength of the sheet or the foil is weak, a supporting plate, e.g. spinel or glass, may be used as a temporary supporting member on which the sheet or foil-like magnetic material is attached with a suitable adhesive.

A first dielectric film layer 2 for electrically isolating the first magnetic layer 1 from a conductive layer 3 is formed by vapor deposition, sputtering or chemical vapor deposition of such materials as $SiO_2$, $Al_2O_3$, $Ta_2O_3$, TaN, $ZnFe_2O_4$, $CdFe_2O_3$ and glass. The material of the conductive layer 3 is formed on the dielectric layer 2 by painting, vapor deposition, sputtering, plating or epitaxial growth of such materials as Al, Cu, Pt, Pd, Au and Ag.

A second dielectric film layer 5 for electrically isolating the conductive layer 3 from a second magnetic layer 7 is formed over the conductive layer 3 and the first dielectric film layer 2 by vapor deposition, sputtering or chemical vapor deposition. The dielectric material used for the second dielectric film layer 5 is the same as one of those listed for the first dielectric layer.

Over the second dielectric film layer 5 a second magnetic layer 7, thickness of which is about 10 $\mu$, is formed by a plating, chemical vapor deposition, sputtering or painting of such materials as permalloy, $MnFe_1O_4$, $NiFe_2O_4$, $(NiZn)Fe_2O_4$ or alloys of Ni—Co. One end of the second magnetic layer 7 is connected to the first magnetic layer 1 thereby constituting the magnetic core member with a gap which is formed between the other ends of the first magnetic layer 1 and the second magnetic layer 7. The first and second dielectric film layers 2 and 5 are interposed between the gap. A supporting layer (not shown) of an organic insulating material such as acryl resin, polyester resin or epoxy resin covers the surface of second magnetic layer 7.

Since the half of the magnetic core member that is the first magnetic layer 1 is prepared by cutting out from a pretreated magnetic material, preferably, rolled permalloy sheet and has a good magnetic property, particularly high magnetic permeability, and further the length of the magnetic path of the first magnetic layer 1 occupies almost one-half of the total magnetic path of the magnetic core member, the reluctance of the first magnetic layer 1 is negligibly small in comparison with that of the second magnetic layer 7. As a result, the magnetic reluctance of the magnetic core member is reduced to about one-half of that of conventional magnetic cores. Consequently the magnetic efficiency or the head efficiency is substantially increased.

Figure 2A:
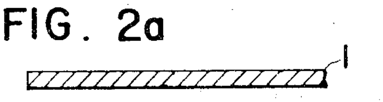
FIG. 2(a) through 2(i) are partial, cross-sectional views of a magnetic head structure illustrating successive stages in the fabrication of a structure like that shown in FIG. 1.
Figure 2B:
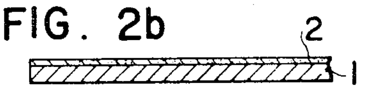
Figure 2C:
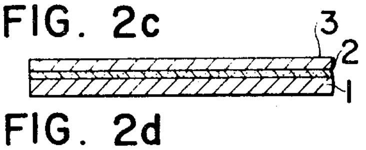
Figure 2D:
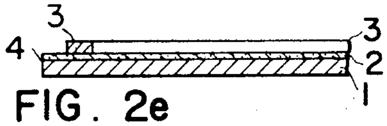
Figure 2E:
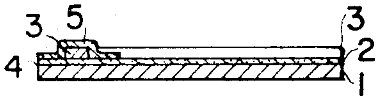
Figure 2F:
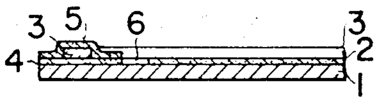
Figure 2G:
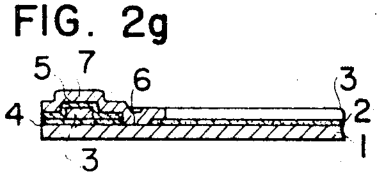
Figure 2H:
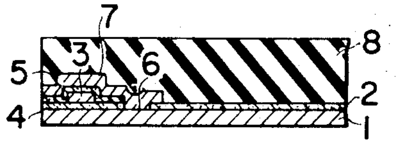

In FIGS. 2(a) through 2(i), a base member 1 in the form of a sheet or foil (FIG. 2(a)) is prepared by cutting out from a pretreated magnetic material. (The defects of the base element or the first magnetic layer 1 are carefully examined beforehand.) Second, as in FIG. 2(b) a thin dielectric film 2 is formed over the first main surface of the first magnetic layer 1. Third, as in FIG. 2(c), a conductive layer 3 is formed on the surface of the dielectric film 2 by using the methods of the vapor deposition and plating jointly. After this, as shown in FIG. 2(d), the conductive layer 3 is etched leaving a portion which is parallel with and spaced from the first side portion 4 of the first magnetic layer 1 by which a recording medium runs. The remaining conductive layer 3 serves as a coil of the magnetic head. Next, as illustrated in FIG. 2(e), a second dielectric film layer 5 is formed for covering the exposed surface of the remaining conductive layer 3, the surface of the first dielectric film layer 2 between the remaining conductive layer 3 and the first said portion 4 and the other surface of the first dielectric film layer 2 to a predetermined distance from the remaining conductive layer 3. After this a predetermined area of the first dielectric film layer 2 which is opposite the side of the first side portion 4 from the remaining conductive layer 3 is partially etched to form hole 6 for exposing the first main surface of the first magnetic layer 1. Next as shown in FIG. 2(g) a second magnetic layer 7 is formed over the second dielectric film layer 5 and the exposed first magnetic layer 1. The magnetic core member of the magnetic head is thus constituted by second magnetic layer 7 together with the first magnetic layer 1 and exhibits a magnetic gap betwen the other ends of the first and second magnetic layers 1 and 7. After this, as shown in FIG. 2(h) a comparatively thick insulating layer 8 is formed over the second magnetic layer 7 and the remaining surface of the first dielectric film layer 2 by molding or manual stacking. Finally the first magnetic layer 1 is etched from the opposite surface of the first magnetic layer 1, masking the corresponding area to the second magnetic layer 7 with a photoresistive material. Thus, the first magnetic layer 1 corresponding to the second magnetic layer 7 is carved out and the magnetic head of the present invention is completed.

As has been explained above, between the magnetic gap there are interposed two kinds of the dielectric film layers, that is, the first and second dielectric film layers 2 and 7. As a result, the gap distance is easily adjusted during the formation of these dielectric film layers.

Figure 3A:
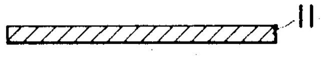
FIG. 3(a) through 3(e) are partial, cross-sectional views of a magnetic head structure illustrating successive stages in the fabrication of another structure of a magnetic head in accordance with the present invention.
Figure 3B:
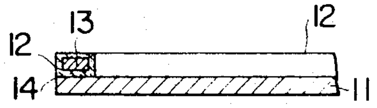
Figure 3C:
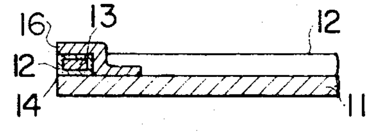
Figure 3D:
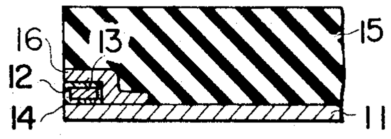

In FIG. 3(a) through 3(e), first as shown in FIG. 3(a), a base member 1 in the form of a sheet or foil is prepared by, e.g., cutting-out from a pretreated magnetic material. After this, a conductive layer 13 cut out in the form of predetermined circuit configuration is attached to the first main surface of the base member 1 by a suitable adhesive, e.g. epoxy resin, so as to align the side portion thereof with the first side portion 14 of the first magnetic layer 1 by which a recording medium runs. The whole surface of the conductive layer is covered with a dielectric film layer 12 formed through electrolytic oxidation. In next step as shown in FIG. 3(c) a second magnetic layer 16 is formed over the dielectric film layer 12 and the exposed surface of the first magnetic layer 11 to a predetermined distance from the conductive layer 13. Then, as depicted in FIG. 3(d), a comparatively thick insulating layer 15 is formed over the second magnetic layer 16 and the exposed surface of the first magnetic layer 11 by molding. Finally the first magnetic layer 11 is etched from the opposite surface of the first magnetic layer 11 while masking the corresponding area of the second magnetic layer 16 with a photoresistive material. Thus, the other magnetic head of the present invention is completed.

Figure 2I:
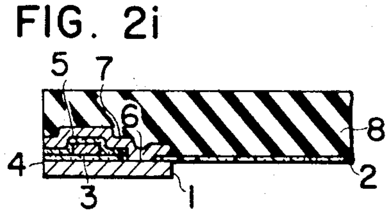
Figure 3E:
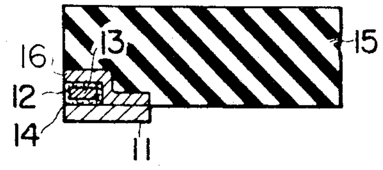

As has been explained above, the steps for manufacturing the magnetic head shown in FIG. 3(e) is reduced as compared with that of FIG. 2(i).

We have explained the formation of one magnetic head in the above embodiments for convenience purpose, however the present invention is most advantageous when the magnetic head explained above is formed in parallel relation on a suitable common supporting layer such as spinel or glass.

It is understood that the embodiments disclosed herein are susceptible to numerous changes and modifications, as will be apparent to a person skilled in the art. Accordingly, the present invention is not limited to the details shown and described herein but intended to cover any such changes and modifications within the scope of the invention.

We claim:

1. A magnetic head comprising:

a pretreated magnetic substrate sheet having a high magnetic permeability;

a first dielectric film layer disposed on said pretreated magnetic sheet and extending to one side portion thereof;

a conductive layer formed on said first dielectric film layer, said conductive layer being spaced from and in parallel with said one side portion of said pretreated magnetic sheet such that a surface portion of said first dielectric film layer adjacent said one side portion remains uncovered;

a second dielectric film layer formed over the surface of said conductive layer and the uncovered surface portion of said first dielectric film layer;

a magnetic layer formed over said second dielectric film layer such that one end portion thereof is connected to said pretreated magnetic sheet and the other end portion thereof constitutes a magnetic gap together with said pretreated magnetic sheet with said first and second dielectric film layers interposed therebetween at said one side portion.

2. A magnetic head according to claim 1 wherein said first pretreated magnetic sheet is rolled permalloy.

3. A magnetic head according to claim 1 further comprising a supporting insulating layer formed over said magnetic layer.

4. A magnetic head according to claim 1 wherein said pre-treated magnetic sheet is selected from the group consisting of permalloy and alloys of Ni—Fe—Mo, Ni—Co, Fe—Ni—Co—Al, Cu, Fe—Cu—Ni, Fe—Cu—Ni—Co, Fe—Co or Mn—Bi.

5. A magnetic head according to claim 1 wherein said first and second dielectric film layers are selected from the group consisting of $SiO_2$, $Al_2O_3$, $Ta_2O_3$, TaN, $ZnFe_2O_4$, $CdFe_2O_5$ and glass.

6. A magnetic head according to claim 1 wherein said magnetic layer is selected from the group permalloy, $MnFeO_4$, $NiFe_2O_4$, $(NiZn)Fe_2O_4$ or alloys of Ni—Co.

7. A magnetic head according to claim 1, wherein the pretreated magnetic substrate sheet has a magnetic path length approximately one-half the total magnetic path length of a magnetic core member formed of the magnetic substrate sheet and the magnetic layer.

8. A magnetic head according to claim 7, wherein the magnetic core member has a magnetic reluctance which is reduced by one-half.

9. A magnetic head comprising:

a pretreated magnetic substrate sheet having a first edge and a second edge located at opposite sides of the major surfaces thereof, said magnetic substrate sheet having a high magnetic permeability;

a first dielectric film disposed on said magnetic sheet extending to said first edge but not to said second edge thereof such that the surface portion of said magnetic sheet adjacent said second edge is uncovered by said first dielectric film;

a conductive layer formed on a central portion of said first dielectric film such that first and second surface portions of said first dielectric film respectively juxtaposed to said first edge and the exposed surface portion of said magnetic sheet are exposed;

a second dielectric film formed over said conductive layer and the first and second exposed portions of said first dielectric film;

a magnetic layer disposed on said second dielectric film and in contact with that part of the uncovered portion of said magnetic sheet adjacent said first dielectric film.

10. A magnetic head according to claim 9 further comprising a third dielectric film disposed on the surface of said magnetic sheet between said second edge thereof and said magnetic layer.

11. A magnetic head according to claim 9 further comprising a supporting insulating layer provided over said magnetic layer.

12. A magnetic head according to claim 11 wherein said supporting layer extends laterally beyond the intersection of said magnetic sheet and said magnetic layer.

* * * * *